United States Patent
Shepherd

(10) Patent No.: US 9,682,688 B2
(45) Date of Patent: Jun. 20, 2017

(54) AUTOMOBILE WASH WAND

(71) Applicant: John Shepherd, Azusa, CA (US)

(72) Inventor: John Shepherd, Azusa, CA (US)

(*) Notice: Subject to any disclaimer, the term of this patent is extended or adjusted under 35 U.S.C. 154(b) by 104 days.

(21) Appl. No.: 14/682,272

(22) Filed: Apr. 9, 2015

(65) Prior Publication Data
US 2016/0297407 A1 Oct. 13, 2016

(51) Int. Cl.
*B60S 3/04* (2006.01)
*A46B 5/00* (2006.01)
*A46B 9/02* (2006.01)
*A47L 13/20* (2006.01)

(52) U.S. Cl.
CPC ............ *B60S 3/047* (2013.01); *A46B 5/0062* (2013.01); *A46B 9/02* (2013.01); *A47L 13/20* (2013.01)

(58) Field of Classification Search
CPC ... B60S 3/00; B60S 3/047; A46B 9/02; A46B 2200/3046; A47L 13/20; A47L 13/24; A47L 13/25; A47L 13/254
USPC ........................................ 401/289; 73/150 R
See application file for complete search history.

(56) References Cited

U.S. PATENT DOCUMENTS

| | | | | |
|---|---|---|---|---|
| 1,718,117 A * | 6/1929 | Dainos | ................. | A46B 11/063 401/289 |
| 3,619,074 A * | 11/1971 | Morawski | ............ | A46B 11/066 401/246 |
| 4,066,366 A * | 1/1978 | Reynolds | ............. | A46B 11/063 401/285 |
| 8,267,607 B2 * | 9/2012 | Harris | ..................... | A47L 13/22 401/139 |
| 2004/0265043 A1* | 12/2004 | Palme | .................. | A46B 11/063 401/289 |
| 2005/0191116 A1* | 9/2005 | Flanery | ..................... | A47L 1/15 401/272 |
| 2011/0020051 A1* | 1/2011 | Robertson | ............... | A47L 13/22 401/268 |
| 2011/0126854 A1* | 6/2011 | Frey | ..................... | A01K 13/001 401/261 |
| 2015/0107041 A1* | 4/2015 | Pellerin | .................. | B60S 3/041 15/160 |

* cited by examiner

*Primary Examiner* — Jennifer C Chiang
*Assistant Examiner* — Bradley Oliver
(74) *Attorney, Agent, or Firm* — Kenneth L. Green; Averill & Green

(57) ABSTRACT

An automobile washing wand includes a starfish shaped head having fingers reaching into tight corners of automobile exteriors. The head includes ports for water and soap to escape and bristles for scrubbing, and is attached to a stalk by a ball joint. A small cross-section water line runs through the stalk to supply water to the head while minimizing weight added to the wand by the presence of water in the wand. A liquid soap bottle is attached near a handle at the base of the stalk, and a selector has an OFF position, a RINSE position, and a WASH position.

14 Claims, 2 Drawing Sheets

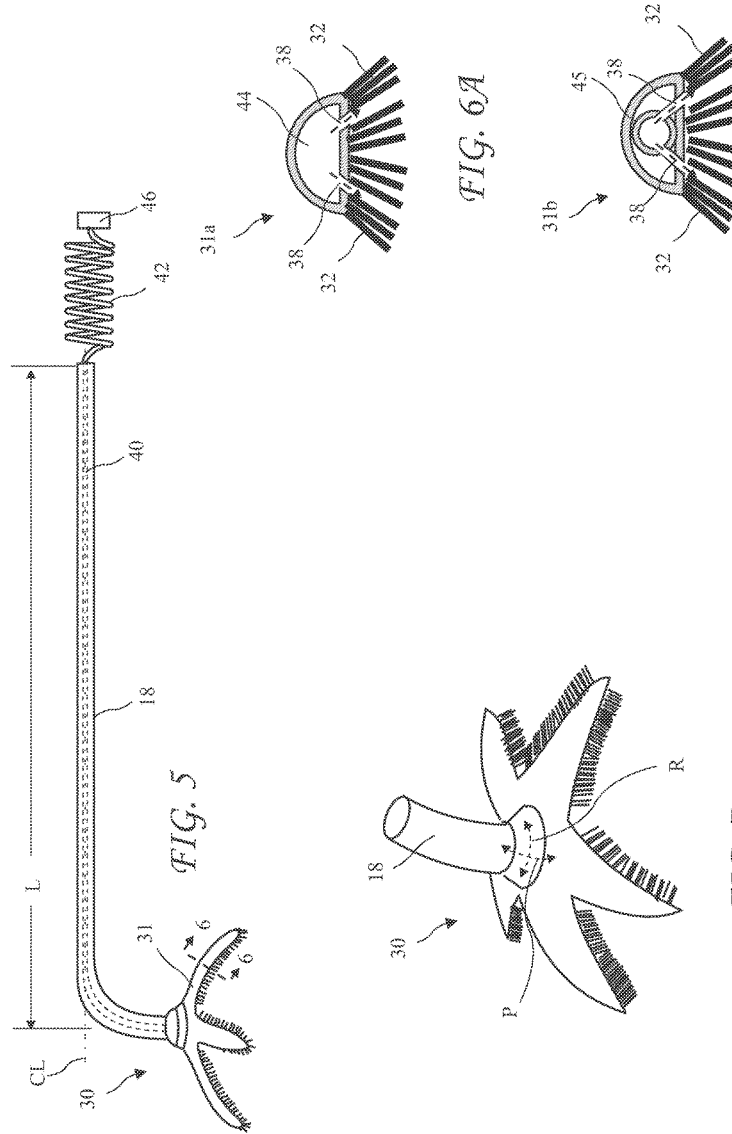

AUTOMOBILE WASH WAND

BACKGROUND OF THE INVENTION

The present invention relates to cleaning tools and in particular to a hand held wand for washing automobiles.

Automobile owners often identify with the automobiles and are seen with their automobiles in public. Because automobiles are driven and parked in exposed areas, they quickly can become soiled and unattractive. The owners may be embarrassed or uncomfortable in these situations.

Commercial car washes are common and provide car washing services to owners. Unfortunately, the cost of these services may be high, and some of these services wash wax coating off the automobile paint, exposing the paint to the weather. As a result, automobile owners often choose to wash their own cars. Various tools are available for such washing, including wands extending the owner's reach. Unfortunately, known wands do not reach into the various corners present on automobile exteriors.

BRIEF SUMMARY OF THE INVENTION

The present invention addresses the above and other needs by providing an automobile washing wand which includes a starfish shaped head having fingers reaching into tight corners of automobile exteriors. The head includes ports for water and soap to escape and bristles for scrubbing, and is attached to a stalk by a ball joint. A small cross-section water line runs through the stalk to supply water to the head while minimizing weight added to the wand by the presence of water in the wand. A liquid soap bottle is attached near a handle at the base of the stalk, and a selector has an OFF position, a RINSE position, and a WASH position.

In accordance with one aspect of the invention, there is provided an automobile wash wand having a starfish shaped head. The head has at least three fingers, and preferably between three and six fingers, and more preferably five fingers. The fingers allow the head to clean inside tight corners.

In accordance with one aspect of the invention, there is provided a light weight automobile wash wand. A small diameter tube reaches through a stalk carrying water to the head. Most of the stalk is empty, reducing weights.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 5 shows a side view of the automobile wash wand according to the present invention.

FIG. 6A shows a cross-sectional view of a first finger of the starfish shaped head of the automobile wash wand according to the present invention taken along line 6-6 of FIG. 5.

FIG. 6B shows a cross-sectional view of a second finger of the starfish shaped head of the automobile wash wand according to the present invention taken along line 6-6 of FIG. 5.

FIG. 7 shows operation of a ball joint head mount according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
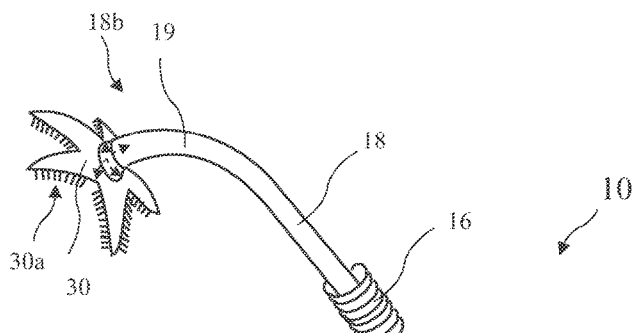
FIG. 1 shows a perspective view of an automobile wash wand according to the present invention.

A perspective vew of an automobile wash wand 10 according to the present invention is shown in FIG. 1. The automobile wash wand 10 includes a first handle 12 at a base of a stalk 18, and soap bottle 20 and selector 14 just above the handle 12, an optional second handle 16 spaced apart from the first handle 12 and on the stalk 18, and a flexible starfish shaped head 30 at an end of the stalk 18 opposite the handle 12. The stalk 18 has a bent portion 19 near the head 30. A first end of the stalk 18a is connectable to a water source, and the head 30 is attached at a second end 18b opposite to the first end 18a. Fingers 31 extending from the head 30 are curved and the head 30 forms a concave dished shape.

Figure 2:
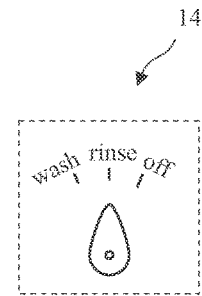
FIG. 2 shows a bottom view of a starfish shaped head of the automobile wash wand according to the present invention.
Figure 3:
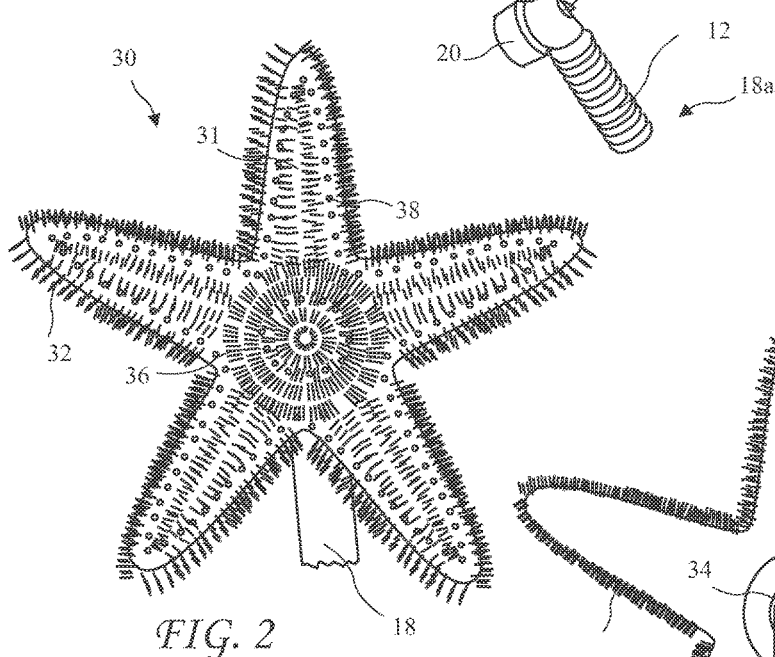
FIG. 3 shows a top view of the starfish shaped head of the automobile wash wand according to the present invention.

A bottom view of the starfish shaped head 30 of the automobile wash wand 10 is shown in FIG. 2 and a top view of the starfish shaped head 30 of the automobile wash wand 10 is shown in FIG. 3. The starfish shaped head 30 is connected to the stalk 18 by a ball (or swivel) joint 34. Bristles 32 cover a face 30a and surround fingers 31 of the starfish shaped head 30 and center ports 36 residing at the center of the starfish shaped head 30 and finger ports 38 along edges of the fingers 31. The ports 36 and 38 are in fluid communication with a water source connected to the opposite end of the stalk 18. The head 30 preferably has a radius R of between four and five inches.

Figure 4:
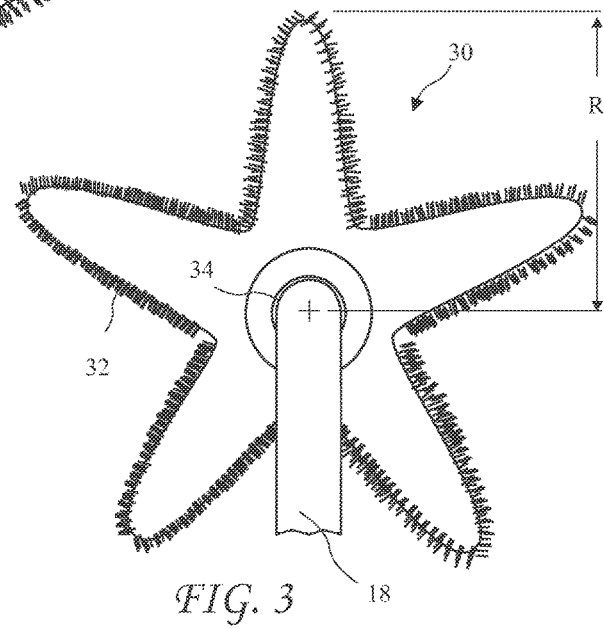
FIG. 4 shows a selector of the automobile wash wand according to the present invention.

The selector 14 of the automobile wash wand 10 is shown in FIG. 4. The selector 14 preferably has three positions, OFF, RINSE, and WASH, but may only have OFF and WASH positions. Soap in the soap bottle 20 may be drawn from the soap bottle 20 using the Bernoulli Principle when the selector is in the WASH position.

A side view of the automobile wash wand 10 is shown in FIG. 5. The stalk has a length L of preferably between 24 and 36 inches. The stalk 18 is preferably made from a hollow tube, and a small diameter line 18 runs through the stalk 18 carrying water to the head 30. The line 18 is preferably between 3/16 and 3/8 inches in diameter. Because the line 40 is small diameter, the amount of water in the stalk 18 is reduced, and the weight of the automobile wash wand 10 is more manageable. The tubing 40 may continue past the end of the stalk and form a coil 42 ending in a hose connection 46. The hose connection 46 is preferably a standard female hose connection and the coil 42 may be expanded and self retracts, making use of the automobile wash wand 10 easier.

A cross-sectional view of a first finger 31a of the starfish shaped head 30 taken along line 6-6 of FIG. 5 is shown in FIG. 6A, and a cross-sectional view of a second finger 31b of the starfish shaped head 30 is shown in FIG. 6B. The finger 31*a* is hollow and water is released from the hollow interior 44 through the ports 38. The finger 31*b* houses tubing 45 carrying the water, again released through ports 38.

Operation of the ball joint 34 head mount is shown in FIG. 7. The ball joint 34 allows the head 30 rotational motion R and pivotal motion P with respect to the stalk 18.

The stalk is preferably made from aluminum tubing and the head is preferably made from rubber or soft plastic. The bristles are preferably made from a soft nylon material and are closely packed, providing 100 percent coverage of the face 30*a* and are between 0.25 and 0.75 inches long.

While the invention herein disclosed has been described by means of specific embodiments and applications thereof, numerous modifications and variations could be made thereto by those skilled in the art without departing from the scope of the invention set forth in the claims.

I claim:

1. A wash wand comprising:
   a stalk having a stalk centerline (CL);
   a first end of the stalk connectable to a water source;
   a bend at a second end of the stalk opposite to the first end;
   a flexible starfish shaped head is attached to the second end of the stalk opposite to the first end, the starfish shaped head having at least three fingers, the fingers curved so that the head forms a concave dished shape;
   center water ports in a bottom surface of the starfish shaped head;
   finger water ports in finger bottoms of the fingers of the starfish shaped head; and
   the water ports in fluid communication with the water source through the stalk,
   wherein:
      the finger water ports comprise two rows of finger ports proximal to edges of the fingers; and
      the two rows of finger ports are angled towards sides of the fingers.

2. The wash wand of claim 1, wherein the starfish shaped head is connected to the stalk by a ball joint.

3. The wash wand of claim 1, further including bristles along edges of the fingers.

4. The wash wand of claim 1, further including a stalk water line reaching through the stalk to carry water through the stalk to the starfish shaped head, the water line continuing and forming a coil of the water line adjacent to the first end of the stalk, the coil extendable and self retracting.

5. The wash wand of claim 4, wherein the stalk water line is between 3/16 and 3/8 inches in diameter.

6. The wash wand of claim 1, further including a soap bottle attached to the stalk and providing soap to a flow of water through the stalk.

7. The wash wand of claim 6, further including a selector controlling the flow of water through the stalk.

8. The wash wand of claim 7, wherein the selector has positions for OFF, RINSE, and WASH to further control a release of the soap into the flow of water through the stalk.

9. The wash wand of claim 1, wherein the bend is between 60 and 90 degrees.

10. The wash wand of claim 1, wherein the starfish shaped head has between three and six fingers.

11. The wash wand of claim 10, wherein the starfish shaped head has five fingers.

12. A wash wand comprising:
   a stalk having a stalk centerline (CL);
   a first end of the stalk connectable to a water source;
   a 60 to 90 degree bend at a second end of the stalk;
   a flexible starfish shaped head is attached by a ball joint to the second end of the stalk opposite to the first end, the starfish shaped head having between three and six fingers, the fingers curved so that the head forms a concave dished shape;
   center water ports in a bottom surface of the starfish shaped head;
   finger water ports in finger bottoms of the fingers of the starfish shaped head; and
   the water ports in fluid communication with the water source through a stalk water line reaching through the stalk, the stalk water line between 3/16 and 3/8 inches in diameter,
   wherein:
      the finger water ports comprise two rows of finger ports proximal to edges of the fingers;
      a stalk water line reaches through the stalk and fingers of the head to carry water through the stalk and to the two rows of finger ports in the starfish shaped head; and
      the two rows of finger ports are angled towards sides of the fingers.

13. A wash wand comprising:
   a stalk having a stalk centerline (CL);
   a first end of the stalk connectable to a water source;
   a 60 to 90 degree bend at a second end of the stalk;
   a flexible starfish shaped head is attached by a ball joint to the second end of the stalk opposite to the first end, the starfish shaped head having five fingers, the fingers curved so that the head forms a concave dished shape;
   center water ports in a bottom surface of the starfish shaped head;
   finger water ports in finger bottoms of the fingers of the starfish shaped head;
   the water ports in fluid communication with the water source through a stalk line reaching through the stalk, the stalk water line between 3/16 and 3/8 inches in diameter; and
   a coil of water line in fluid communication with the stalk water line and adjacent to the first end of the stalk, the coil extendable and self retracting,
   wherein:
      the finger water ports comprise two rows of finger ports proximal to edges of the fingers;
      a stalk water line reaches through the stalk and fingers of the head to carry water through the stalk and to the two rows of finger ports in the starfish shaped head; and
      the two rows of finger ports are angled towards sides of the fingers.

14. The wash wand of claim 1, including a stalk water line reaching though the stalk and fingers of the head to carry water through the stalk and the finger water ports in the starfish shaped head.

\* \* \* \* \*